United States Patent [19]

Berline

[11] 4,037,338
[45] July 26, 1977

[54] VACUUM BELT FILTERS

[76] Inventor: Sylvain Dominique Daniel Léonce Berline, 45 Rue du Belvedere, Mareil-Marly, Yvelines, France

[21] Appl. No.: 643,060

[22] Filed: Dec. 22, 1975

[30] Foreign Application Priority Data

Dec. 26, 1974 France .............................. 74.42864
Apr. 30, 1975 France .............................. 75.13626

[51] Int. Cl.$^2$ ............................................ B01D 33/00
[52] U.S. Cl. ..................................... 210/77; 210/103; 210/122; 210/196; 210/401
[58] Field of Search ................. 210/27, 103, 105, 122, 210/400, 401, 160, 196; 209/307; 162/348

[56] References Cited

U.S. PATENT DOCUMENTS

| 2,101,109 | 12/1937 | Thomson | 210/197 |
| 2,377,252 | 5/1945 | Lehrecke | 210/197 |
| 3,104,223 | 9/1963 | Kasuya | 210/400 |
| 3,426,908 | 2/1969 | Davis et al. | 210/401 |

Primary Examiner—Frank W. Lutter
Assistant Examiner—William A. Cuchlinski, Jr.
Attorney, Agent, or Firm—Ladas, Parry, Von Gehr, Goldsmith & Deschamps

[57] ABSTRACT

This invention relates to improvements in or relating to vacuum belt filters. It relates further to suction boxes for such filters and to a method of operation of the filters. More particularly, the invention relates to the supporting of the belt of the filter about the suction box so as to minimize drag of the belt and to minimize friction between the belt and the suction box and still seal the suction box. This is accomplished by means of conduits that have deformable walls and are located along the edges of the suction boxes, fluid support cushions being formed in the conduits. This is also accomplished by controlling the fluid support cushion according to the drag on the suction box, the suction pressure in the suction box and the rate of flow of fluid into the conduits to form the support cushion.

9 Claims, 6 Drawing Figures

VACUUM BELT FILTERS

BACKGROUND OF THE INVENTION

This invention relates to improvements in or relating to vacuum belt filters. It relates in particular to a suction box for such a filter and to a method of operation of the filter.

Vacuum belt filters normally have an endless belt, with a central longitudinal opening, which is displaceable over a suction box. The suction box is elongate and is disposed about the opening. The belt further has transverse channels along its upper surface upon which a filter cloth is provided. When a suction pressure is provided in the suction box, filtrate is drawn from material that is to be filtered, and which is carried on the filter cloth, through the opening in the belt into the suction box.

However, due to the suction pressure, the belt is pulled down against the upper edges of the suction box. The frictional engagement between the lower surface of the belt and the upper edges of the suction box results in undue wear of the belt and the suction box, heating of the belt, and drag on the belt which requires extra energy to displace the belt over the suction box.

Further, there must be an adequate seal between the edges of the suction box and the belt, so that air from the atmosphere is not drawn between the lower surface of the belt and the edges of the suction box, thereby decreasing the efficacy of operation of the filter.

SUMMARY OF THE INVENTION

According to a first aspect of the invention there is provided a suction box for a vacuum belt filter having a belt whereon material is carried that is to be filtered by means of a suction force exerted via the suction box and which travels over the suction box, the suction box including a conduit fast with the suction box along each edge thereof parallel to the direction of travel of the belt, each conduit having an inlet opening through which a pressurized support fluid may be introduced into the conduit to provide a support cushion for the belt, and the inner walls of each conduit being resiliently deformable so that the conduits deform, in use, according to the shape of the belt.

The inner wall of each conduit may be resiliently deformable towards and away from the belt and/or towards and away from the interior of the suction box. In order for the conduits to more effectively follow the shape of the belt, the outer wall of each conduit may also be resiliently displaceable towards and away from the belt and/or in a direction parallel to the belt.

The inner wall of each conduit may be solid and may be resiliently fast with the floor of the conduit. They may also be either rigid or flexible. Alternatively the inner wall of each conduit may be of a resiliently deformable material and may have a longitudinal cavity. An opening may be provided through which a fluid may be forced into the cavity to pressurize it. The material of the wall defining the cavity may have a substantial thickness, or each inner wall may comprise a bag of a non-extendable, deformable material having an opening through which a fluid may be forced into the bag to inflate it. The outer walls of the conduits may be similarly constructed, e.g. the outer wall of each conduit may also comprise a bag of a non-extendable, deformable material having an opening through which a fluid may be forced into the bag to inflate it. Such bags may have longitudinal wearing ribs on their outer surfaces.

According to a second aspect of the invention there is provided a vacuum belt filter which includes a belt whereon material that is to be filtered may be carried;

a suction box located below the belt and over which the belt may travel;

support members located along each edge of the suction box parallel to the direction of travel of the belt;

force means for forcing filtrate between the support members and the belt to support the belt on a support cushion of the filtrate; and collecting troughs for collecting filtrate flowing out between the support members and the belt. By this means, the amount of fluid utilised to support the belt is not critical and the support fluid does not dilute the filtrate.

According to a third aspect of the invention, there is provided a vacuum belt filter which includes, a belt whereon material that is to be filtered may be carried;

a suction box located below the belt and over which the belt may travel;

support members located along each edge of the suction box parallel to the direction of travel of the belt;

force means for forcing a support fluid between the support members and the belt to form a support cushion for the belt; and control means for controlling the rate of flow of the support fluid forced between the support members and the belt. By this means, the amount of support fluid is minimised.

The force means may be a controllable pump, a gravity feed arrangement, or the like.

The vacuum belt filter may include measuring means for measuring the drag of the belt on the support members, the control means being responsive to the measuring means such that just sufficient of the support fluid is forced between the support members and the belt to reduce the drag on the support members to be below a predetermined value.

The measuring means of this embodiment may be a force transducer, which measures the drag experienced by the support members. Such a transducer may be hydraulically, mechanically, pneumatically or electrically operable.

Alternatively, the vacuum belt filter may include measuring means for measuring the suction pressure in the suction box, the control means being responsive to the measuring means.

The measuring means of this embodiment may similarly be a pressure transducer that is hydraulically, pneumatically, electrically or mechanically operable.

In a further alternative embodiment the control means may be adapted to maintain the rate of flow of the support fluid at a predetermined value. With this embodiment, the control means may be a constant flow rate value. Alternatively as with the earlier embodiments, a flow rate measuring device may be provided to measure the flow rate of the support fluid, the control means being responsive thereto.

The control means may also be electrically, hydraulically pneumatically or mechanically operable. It may comprise a controllable value, or it may be a suitable device to vary the operation of a pump, or the like.

According to a fourth aspect of the invention, there is provided a method of operating a vacuum belt filter having a belt whereon material is carried that is to be filtered by means of a suction force exerted via a suction box located below the belt, including causing the belt to travel over the suction box;
depressurizing the interior of the suction box; and
forcing a support fluid into conduits located along each edge of the suction box parallel to the direction of travel of the belt, each conduit having an inner wall that is resiliently deformable, to create a fluid support cushion on which the belt is supported.

Just sufficient of the support fluid may be forced into the conduits to lift the belt clear of the walls of the conduits. If the walls of the conduits have cavities, or are in the form of bags, the cavities or the bags may be pressurized to a pressure equal to or slightly different from the pressure in the conduits.

According to a fifth aspect of the invention, there is provided a method of operating a vacuum belt filter having a belt whereon material is carried that is to be filtered by means of a suction force exerted via a suction box located below the belt over which the belt travels, which includes supporting the belt on a cushion of the filtrate by forcing a part of the filtrate between support members, located along each edge of the support box, parallel to the direction of travel of the belt, and the belt; and collecting the filtrate that flows out between the belt and the support members.

The collected filtrate may be recycled to form the support cushion, make up filtrate being provided as necessary.

According to a sixth aspect of the invention, there is provided a method of operating a vacuum belt filter having a belt whereon material is carried that is to be filtered by means of a suction force exerted via a suction box located below the belt, over which the belt travels, which includes forcing a support fluid between support members, located along each edge of the suction box, and the belt to form a fluid support cushion for the belt; and controlling the rate of flow of the support fluid forced between the support members and the belt.

The drag of the belt on the support members may be measured and the rate of flow of the support fluid may be responsively controlled to reduce the drag on the support members to be below a predetermined amount.

Alternatively, the suction pressure in the suction box may be measured and the rate of flow of the support fluid may be controlled in accordance therewith.

As a further alternative, the rate of flow of the support fluid may be maintained at a predetermined value.

DESCRIPTION OF THE DRAWINGS

The invention will now be described, by way of examples, with reference to the accompanying drawings, in which.

DESCRIPTION OF THE PREFERRED EMBODIMENTS

Figure 1:
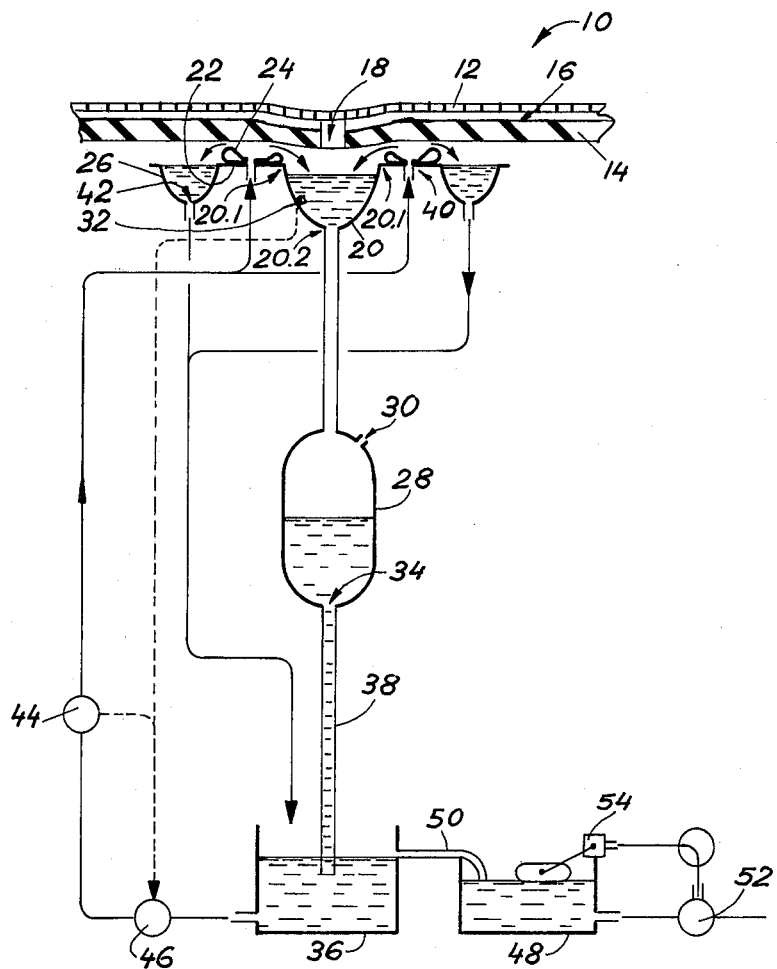
FIG. 1 shows a schematic sectional view of a vacuum belt filter, in which filtrate is utilised to support the belt of the filter.

Referring to FIG. 1, the vacuum belt filter is referred to generally by reference numeral 10. The vacuum belt filter 10 has a filter cloth 12 that rests on a belt 14. The belt 14 is endless and is driven and supported by spaced rollers (not shown). The upper half of the belt 14, which is shown, is disposed to travel along a horizontal path. For the sake of clarity, the lower, inoperative half of the belt 14 is not shown. The belt 14 has a number of transverse drainage channels 16 on its upper, outer surface, for draining filtrate from material (not shown) carried on the filter cloth 12. The belt 14 further has a central, longitudinal slit 18, through which the filtrate is removed.

The filter 10 further has an elongate suction box 20 located below the belt 14, about the slit 18. Along each longitudinal edge 20.1 of the suction box 20, rigid support bases 22 are provided on which are mounted conduits 24. These conduits 24 will be discussed in more detail hereinafter. Along the outer edges of the support bases 22, there are collecting troughs 26. In this specification, by "inner" in relation to the suction box 20, or its associated support bases 22 and conduits 24, is meant that region closer to the interior of the suction box 20. "Outer" accordingly has a corresponding meaning.

A suction opening 20.2 is provided in the base of the suction box 20, through which the interior of the suction box 20 is in suction communication with a separating tank 28. The separating tank 28 has a suction opening 30 through which the tank 28 and the suction box 20 are depressurized by means of a suction pump (not shown). An hydraulically operated transducer 32 is mounted in a wall of the suction box 20, for measuring the suction pressure therein. The separating tank 28 has a drainage outlet 34 that is connected to a base tank 36 (that is open to the atmosphere) by means of a pipe 38. This pipe 38 and the base tank 36 form a barometric leg, the filtrate flowing from the separating tank 28 to the base tank 36 by gravitational action.

Feed openings 40 are provided in the support bases 22 and the conduits 24, through which a support fluid may be forced into the conduits 24 to form a support cushion for the belt 14 and seal the region between the suction box 20 and the belt 14.

The collecting troughs 26 have drainage openings 42, through which support fluid that escapes between the outer walls of the conduits 24 and the lower surface of the belt 14, into the collecting troughs 26, is drained.

In the particular embodiment shown in FIG. 1, a part of the filtrate is used as the support fluid. Accordingly, the drainage openings 42 of the collecting troughs 26 return the filtrate collected therein to the base tank 36. Filtrate that is to be used to form the support cushion is pumped from the base tank 36, through a flow rate meter 44, into the conduits 24, by a controllable pump 46. The speed of the pump 46 is controlled by either the suction pressure transducer 32, or the flow rate meter 44.

A second base tank 48 is connected to the base tank 36 by an overflow pipe 50. The excess filtrate in the second base tank 48 is removed by an extraction pump 52 controlled by a float-operated control device 54.

In operation, due to the suction pressure in the suction box 20, filtrate is drawn from the material carried on the filter cloth 12. This filtrate flows along the drainage channels 16, through the slit 18, into the suction box 20, together with a certain amount of air. The air and filtrate flow into the separating tank 28, where the air and the filtrate are separated. The air is sucked out through the opening 30 by the suction pump, and the filtrate flows through the pipe 38. Due to the barometric effect of the filtrate in the pipe 30, the suction pressure is kept substantially constant.

A portion of the filtrate is pumped into the conduits 24 by the pump 46, to create a support cushion for the belt 14. This support cushion is regulated so as to just lift the belt 14 clear of the conduits 24. Filtrate that leaks out between the belt 14 and the conduits 24, is collected in the suction box 20 and in the collecting troughs 26 and returned to the base tank 36. If the suction pressure increases, resulting in a greater downward force being exerted on the belt 14, the flow rate would normally decrease, as the clearance between the walls of the conduits 24 and the belt 14 is decreased. However, if the flow rate of the filtrate used to form the cushion is controlled in accordance with the suction pressure, by means of the pressure transducer 32, when the suction pressure increases, the pump 46 is caused to turn faster, generating a larger pumping pressure, which restores the clearance between the conduits 24 and the belt 14 to keep the flow rate constant. Alternatively, if the flow rate is measured by means of the flow rate meter 44 and the pump 46 controlled accordingly. By this means, the flow rate of the cushion fluid is kept at a minimal value, whilst still effectively supporting the belt 14 and forming an effective seal.

Excess filtrate overflows from the base tank 36 to the second base tank 48, from where it is extracted by the extraction pump 52.

Figures 2, 3:
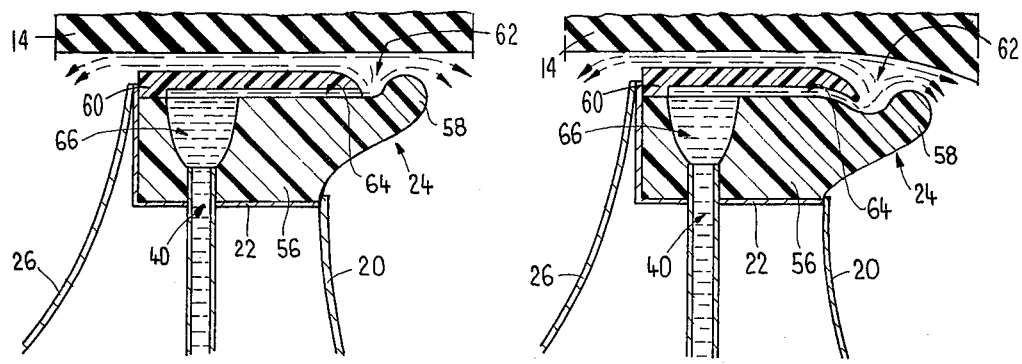
FIG. 2 shows a sectional view of one embodiment of one of the conduits for the suction box of the vacuum belt filter, with the conduit and the belt in their non-deformed states.
FIG. 3 shows the conduit of FIG. 2 in its deformed state due to deformation of the belt.

Referring to FIGS. 2 and 3, one embodiment of the conduits 24 is shown. For the sake of clarity, only one of the conduits 24 provided along the edges of the suction box 20 is shown. The conduit 24 comprises a lower element 56 having the feed opening 40. This lower element 56 is fast with the support base 22 and is of a compressible, flexibly deformable rubber or synthetic plastics material. Along its inner end, the lower element has a lip 58, which forms the inner wall of the conduit 24. The conduit 24 also comprises an upper element 60, which is also of a compressible, flexibly deformable rubber or synthetic plastics material, that is fast with the lower element 56. This upper element 60, is shaped along its inner edge so that it forms, in conjunction with the lip 58, the channel 62 of the conduit 24. This upper element 60 thus forms the outer wall of the conduit 24. A number of transverse ducts 64 are provided in the upper element 60 through which the channel 62 is in communication with a cavity 66 in the lower element 56, which in turn is in communication with the feed opening 40.

In operation, the support fluid, which may be the filtrate itself or any other suitable fluid (more particularly a liquid) such as water, is pumped through the feed opening 40, into the cavity, and through the ducts 64 into the channel 62. Due to the pressure of the support fluid, the belt 14 is lifted from the walls of the conduit 24, in this case the upper surface of the lip 58 and the upper surface of the upper element 60, to form a fluid support cushion. If the pressure of the support fluid is too great, support fluid will flow out from between the lip 58 and the upper element 60, and the belt 14. In the limiting condition, if the pressure of the support fluid is just sufficient to lift the belt 14, and the clearance between the lip 58 and the upper element 60, and the belt 14 is minimal, a minimal amount of the fluid will flow out.

As shown in FIG. 3, if the belt 14 deforms, the lip 58 and the upper element 60 also deform. By this means, the clearance between the lip 58 and the upper element 60, and the belt 14, is kept relatively constant, ensuring that the support cushion supports the belt 14 uniformly across the width of the conduit 24 and hinders greater leakage along one end. Thus, the conduit 24 automatically adapts to the shape assumed by the belt 14.

Figure 4:
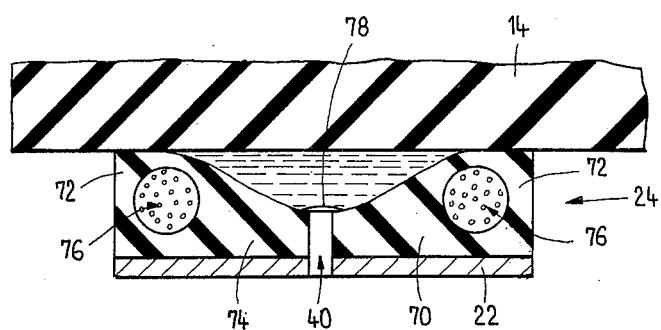
FIG. 4 shows a further embodiment of one of the conduits, in its non-deformed state.

Referring to FIG. 4, a further embodiment of a conduit 24 is shown. This conduit 24 comprises a channel-shaped element 70, also of a resiliently compressible and deformable rubber or synthetic plastics material. The element 70 has walls 72 and a floor 74. In the walls 72 are longitudinal cavities 76, which are filled with the support fluid from one end. The element 70 is secured to the support base 22 by rivets 78 and has a number of feed openings 40 in its floor 74. Similarly, as with the embodiment of FIGS. 2 and 3, the walls 72 deform according to the shape of the belt 14, the longitudinal cavities being deformed.

Figure 5:
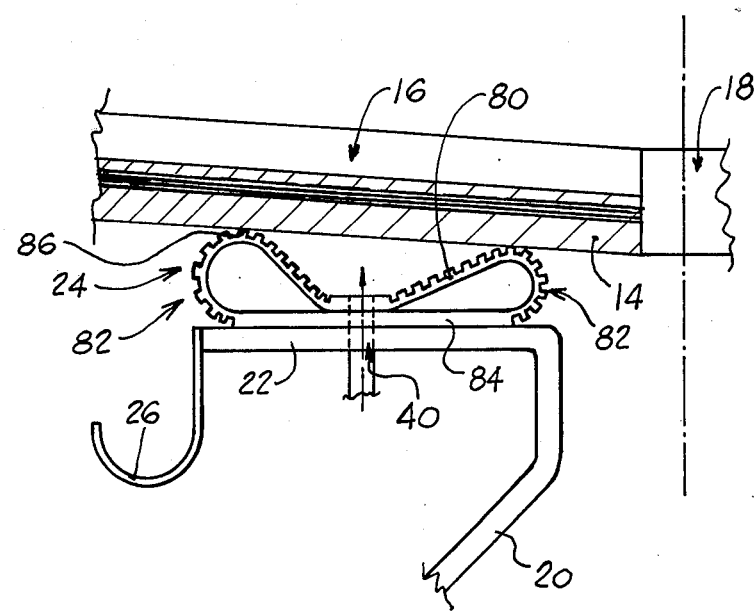
FIG. 5 shows a further embodiment of one of the conduits, in its deformed state.

Referring to FIG. 5, a further embodiment of the conduit 24 is shown. This conduit 24 comprises a sheet of a non-extendable rubber or synthetic plastics material 80, that is formed into two bags 82, the bags 82 forming the walls of the conduit 24. The sheet 80 has longitudinal wearing ribs 86. The floor portion 84 of the sheet 80 is suitably secured to the support base 22. The feed openings 40 are provided in the sheet 80 through which the support fluid is forced into the channel region 62 of the conduit 24. The support fluid is also forced into the bags 82 through suitable openings (not shown) to inflate the bags 82. In operation, the pressure of the fluid in the bags 82 is made slightly equal to or greater than the pressure of the fluid in the channel region 62.

As the sheet 80 is of a non-extendable material, as the belt 14 deforms, the bags 82 deform accordingly, to automatically adjust to the shape of the belt 14.

Figure 6:
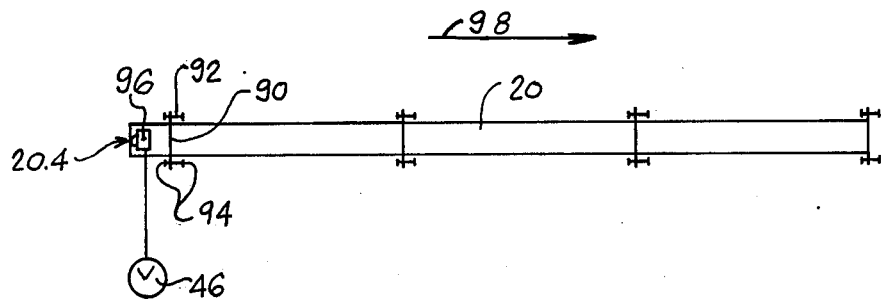
FIG. 6 shows a schematic underneath plan view of the suction box and its support arrangement.

Referring finally to FIG. 6, the suction box 20 is shown movably mounted by struts 90 on support members 92 having limiting stop formations 94. The direction of travel of the belt being indicated by the arrow 98. At the trailing end 20.4 of the suction box 20, a force transducer 96 is provided. The force transducer 96 is fixed and measures the drag of the belt 14 on the conduits 24, as the conduits 24 are fast with the suction box 20. The force transducer 96 is operatively linked with the pump 46 (shown in FIG. 1) to regulate the pressure, and thus the flow rate, of the fluid used to form the support cushion.

The arrangement is such that the flow rate of the support fluid is increased until the drag measured by the force transducer 96 is below a predetermined value.

I claim:

1. A suction box for a vacuum belt filter having a belt whereon material is carried that is to be filtered by means of a suction force exerted via the suction box and which travels over the suction box, the suction box including a conduit fast with the suction box along each edge thereof parallel to the direction of travel of the belt, each conduit having an inner and an outer wall and an inlet opening through which a pressurized support fluid may be introduced into the conduit to provide a support cushion for the belt, and the inner wall of each conduit being of a resiliently deformable material and having a longitudinal cavity and an opening through which a pressurizing fluid may be forced into the cavity to pressurize it so that the conduits deform, in use, according to the shape of the belt.

2. A suction box as claimed in claim 1, in which each inner wall comprises a bag of a non-extendable, deformable material which is inflated by the pressurizing fluid.

3. A suction box as claimed in claim 2, in which the outer wall of each conduit comprises a bag of a non-extendable, deformable material having an opening through which a fluid may be forced into the bag to inflate it.

4. A suction box as claimed in claim 2, in which each bag has longitudinal wearing ribs on its outer surface.

5. A vacuum belt filter which includes,
a belt whereon material that is to be filtered may be carried;
a suction box located below the belt and over which the belt may travel;
support members located along each edge of the suction box parallel to the direction of travel of the belt;
force means for forcing a support fluid between the support members and the belt to form a support cushion for the belt;
control means for controlling the rate of flow of the support fluid forced between the support members and the belt; and
measuring means for measuring the drag of the belt on the support members, the control means being responsive to the measuring means such that just sufficient of the support fluid is forced between the support members and the belt to reduce the drag on the support members to be below a predetermined value.

6. A vacuum belt filter which includes,
a belt whereon material that is to be filtered may be carried;
a suction box located below the belt and over which the belt may travel;
support members located along each edge of the suction box parallel to the direction of travel of the belt;
force means for forcing a support fluid between the support members and the belt to form a support cushion for the belt;
control means for controlling the rate of flow of the support fluid forced between the support members and the belt; and
measuring means for measuring the suction pressure in the suction box, the control means being responsive to the measuring means.

7. A method of operating a vacuum belt filter having a belt whereon material is carried that is to be filtered by means of a suction force exerted via a suction box located below the belt over which the belt travels, which includes supporting the belt on a cushion of the filtrate by forcing a part of the filtrate between support members, located along each edge of the support box, parallel to the direction of travel of the belt, and the belt; collecting the filtrate that flows out between the belt and the support members; and re-cycling the collected filtrate to form the support cushion.

8. A method of operating a vacuum belt filter having a belt whereon material is carried that is to be filtered by means of a suction force exerted via a suction box located below the belt, over which the belt travels, which includes,
forcing a support fluid between support members, located along each edge of the suction box, and the belt to form a fluid support cushion for the belt;
controlling the rate of flow of the support fluid forced between the support members and the belt;
measuring the drag of the belt on the support members; and
responsively controlling the rate of flow of the support fluid to reduce the drag on the support members to be below a predetermined amount.

9. A method of operating a vacuum belt filter having a belt whereon material is carried that is to be filtered by means of a suction force exerted via a suction box located below the belt, over which the belt travels, which includes
forcing a support fluid between support members, located along each edge of the suction box, and the belt to form a fluid support cushion for the belt;
controlling the rate of flow of the support fluid forced between the support members and the belt;
measuring the suction pressure in the suction box; and
controlling the rate of flow of the support fluid in accordance therewith.

* * * * *